United States Patent [19]
Warszawski

[11] 3,902,916
[45] Sept. 2, 1975

[54] RECHARGEABLE ELECTROCHEMICAL GENERATOR

[75] Inventor: Bernard Warszawski, Paris, France

[73] Assignee: Societe Generale de Constructions Electriques et Mechaniques (ALSTHOM), France

[22] Filed: July 20, 1972

[21] Appl. No.: 273,423

[30] Foreign Application Priority Data
July 20, 1971 France .............................. 71.26616

[52] U.S. Cl. .............................. 136/86 A; 136/86 R
[51] Int. Cl. ..................... H01m 29/02; H01m 29/04
[58] Field of Search...... 136/86 A, 86 R, 86 D, 159, 136/160, 163

[56] References Cited
UNITED STATES PATENTS
3,359,136    12/1967   Merten et al. ..................... 136/86 A
3,690,954    9/1972   Warszawski et al. ............. 136/86 R Primary Examiner—John H. Mack
Assistant Examiner—H. A. Feeley
Attorney, Agent, or Firm—Craig & Antonelli

[57] ABSTRACT

An electrochemical generator (e.g. a battery) which is rechargeable electrochemically with liquid electrolyte having negative electrodes of zinc and the positive non-porous electrodes that are contacted on the same face by the electrolyte and an oxygen-containing gas.

The generator or battery comprises a repetitive unit of groups of thin, plate-like, components, each group having a total thickness that is preferably smaller than about 1 millimeter and comprising an impervious bipolar electrode, a microporous membrane, and means for maintaining an essentially constant spacing between said bipolar electrode and the membrane.

These generators are capable of providing long service lives and/or a large specific power or output.

35 Claims, 4 Drawing Figures

PATENTED SEP 2 1975 3,902,916

RECHARGEABLE ELECTROCHEMICAL GENERATOR

The present invention relates to an electrochemical generator of electric energy, i.e. a battery which is rechargeable electrochemically with liquid electrolyte, having negative electrodes made of zinc, and positive electrodes supplied with a gas containing oxygen.

It has been known for a long time that zinc can be used as active negative material in electrochemical generators or gas batteries which are rechargeable electrochemically with liquid electrolyte, particularly an alkaline electrolyte, such as potash for example, and whose positive electrodes are supplied with oxygen or a gas containing oxygen.

Nevertheless, it still has not been possible, to date, to obtain long service life periods and/or a large specific output with such rechargeable generators.

As a matter of fact, on the one hand, the zinc oxide produced during the discharge can cause the passivation of the zinc electrode on which it is formed; and on the other hand, since the electrolyte dissolves or forms at the time of discharge a certain quantity of zincate, the zincate ions present in the electrolyte can — at the moment of or during the recharge cycle of the generator — be the cause of the formation of zinc dendrites.

In accordance with the investigations of the invention it has been found that this passivation of the zinc and the formation of zinc dendrites were linked to or influenced by the conditions of supplying the zinc electrode with the alkaline electrolyte.

Furthermore, the positive electrodes presently employed which are porous and exhibit a gaseous diffusion are poorly suited for making generators which are reliable and have a low compactness or density. Consequently, these positive electrodes generally deteriorate during the recharging operations by reason of the freeing or emission of oxygen within the porous structure. This emission of oxygen may lead to the destruction of the electrode structure, as well as to the corrosion of the catalyst and/or of the material supporting the catalyst.

It has now been found that the application to this type of rechargeable electrochemical generator of an electrode structure (of the type the inventor has conceived and perfected for fuel cells) in which the electrolyte is subjected to an energetic flow or forced convection movement within a small space, provides excellent results and avoids the difficulties heretofore noted.

This forced convection movement of the electrolyte prevents in particular the passivation of the zinc electrodes due to accumulation of zinc oxide and reduces considerably the formation of dendrites (i.e. zinc dendrites) at the time of the recharge. Moreover, the air electrodes perfected by the inventor for use in fuel cells, which have a very thin, non-porous structure and in which the electrolyte and the gas are supplied to the same side of the electrode do not undergo any appreciable deterioration during the recharging of the generator.

The present invention thus contemplates an electrochemical generator of electric energy which is rechargeable electrochemically with liquid electrolyte, particularly an alkaline electrolyte, having negative electrodes made of zinc and non-porous positive electrodes contacted or supplied on the same surface by a gas containing oxygen and the electrolyte and means for circulating the electrolyte therethrough in such a manner that passivation of the zinc during discharging is prevented and the formation of dendrites during recharging is considerably reduced. More specifically, this invention is directed to an electrochemical generator which comprises:

a. a repetitive piling or arrangement of groups of thin, plate-like, components equipped on their edges — consisting generally of a frame made from insulating synthetic material and defining active portions having an essentially rectangular configuration — with openings, providing by virtue of their superposition, inflow (inlet) and outflow (outlet) channels for the electrolyte, on the one hand, and for a gas containing oxygen on the other hand, each group having a total thickness that is preferably smaller than about 1 millimeter and comprising:

an impervious bipolar electrode equipped on one side with a conductive contact surface of a catalytic plating or coating for reducing the oxygen gas circulating at its contact in hydroxyl ions, and on the other side with a zinc layer or coating, a microporous membrane, at least some of these components being provided on the edges thereof with microchannels for introducing, on the one hand, the electrolyte from the aforementioned inflow (or inlet) channels towards the zinc layer along its surface, and on the other hand, gas containing oxygen towards the conducting surface with the catalytic coating, and with microchannels for evacuating or removing, on the one hand, electrolyte having circulated along the surface of the zinc layer, and on the other hand residual gas having yielded or given up all or part of the oxygen which it contained after having circulated along the conducting surface with the catalytic coating; the microchannels assuring the same function, i.e. introduction or evacuation, for one and the same fluid presenting an equal loss of charge, the openings provided on the periphery of the components being disposed on two opposite edges and in an even number on each of these edges, the channels being formed due to the superposition of the openings placed on one of these edges being alternately utilized for the supply or the evacuation of fluid from the positive face, and the supply or the evacuation of fluid from the negative face of the bipolar electrode, whereby the flows of the fluids along the faces of the bipolar electrode are parallel with respect to each other and in the same direction, means being provided, such as reliefs, embossing, screens, or the like, for maintaining an essentially constant spacing between these components as well as the free circulation of the fluids with an equidensity of charge losses, the sum of the thicknesses of the peripheral portions of the components being equal to the sum of the thicknesses of the central portions of these components, b. tightening or securing means, such as tie beams, bars or a covering, for keeping the components assembled in the desired arrangement, c. at least one device for the selective precipitation and filtration of the zinc oxide entrained or carried along by the electrolyte, and d. means for causing the electrolyte to circulate from the outlet channels towards said device and from said device towards the inlet channels.

By way of example and not to be constructed as limitative, the respective thicknesses of the bipolar electrode and of the microporous membrane may be on the order of from about 50 to 100 microns.

The means for maintaining an essentially constant spacing between the components and for obtaining the free circulation of the fluids with an equidensity of the charge losses in a manner such as to avoid preferential flows may be provided by the use of a bipolar electrode embossed and in contact along its two surfaces with the adjacent microporous membranes.

This means may also be provided by interposing between the bipolar electrode and the microporous membrane a spacer or separator consisting, for example, of a grid grating, screen, gauze, or web and the dimensions of the mesh thereof may be in the order of several tenths of a millimeter to one millimeter. The use of such means is applicable whether the bipolar electrode is planar or embossed. It is equally possible to use a combination of these means consisting, for example, in employing an embossed bipolar electrode that is in contact with a microporous membrane on the face thereof being supplied with the gas containing oxygen, with the other face thereof being spaced from a microporous membrane by means of a grating or web.

The interposition of a grating or web of insulating material, for example, material made from polyamide, between the face of the bipolar electrode supporting the zinc layer and the microporous membrane is particularly advantageous since this reduces considerably the risks of the formation of dendrite at the time of the recharge.

In fact, in the absence of such a grating or insulating web, the embossed bipolar electrode would be in direct contact with the microporous membrane, and since at the level of these contacts there is an irrigation deficiency, dendrites could be produced at the time of the recharge.

The presence of the insulating grating or web thus allows in this case for regulating the flow of the electrolyte over the entire face of the bipolar electrode supporting the zinc.

When an embossed electrode is used, the presence of a grating or web forming separator means is, on the other hand, hardly justified between the face of the electrode supplied by the gas containing oxygen and the microporous membrane.

More particularly, when the supply of this face of the bipolar electrode is carried out according to the process called "process with a gliding layer", i.e. according to which the electrolyte is supplied to this face solely by migration through the microporous membrane, the microchannels terminating in the space being defined by this face and the microporous membrane serving exclusively for the supply with reactive fluids, it is advantageous that this membrane then be in direct contact with this face of the electrode. In any event, if a grating or web is interposed, it is necessary that it be made from a conductive material.

The spacing between two adjacent microporous membranes may be from several tenths of a millimeter to about 1 millimeter.

The embossing pattern of the bipolar electrode may be widely varied insofar as it allows for assuring a uniform irrigation of the electrode and an equidensity of the charge losses. In case parallel projections are involved, it is particularly advantageous that the spacing of these projections be of the same order of height as the depth thereof to prevent a substantial penetration of the microporous membranes into the cavities formed by this electrode as a result of the eventual dilation or extension of these membranes in the course of time.

At the beginning of the discharge of the generator according to the present invention, the zinc oxide formed is dissolved in the electrolyte and precipitates when the saturation concentration has been reached. The solid zinc oxide is then entrained or carried along by the electrolyte toward the filtering device where it will be retained. This filtering device equally constitutes a selective precipitating device since it can be noted that all the precipitations of zinc oxide are formed or produced afterward at the level of this filtering device after it had been thus seeded; the saturated electrolyte not transporting any solid zinc oxide particles.

In accordance with the present invention, the generator may comprise means for forming an emulsion of the gas containing the oxygen in a liquid alkaline electrolyte (which is preferably of the same type of electrolyte circulating in contact with the zinc layer) prior to its introduction in contact with the conducting surface having the catalytic coating.

The electrolyte inflow and/or evacuation means which are usable for the purposes of the present invention may advantageously be those described in the following French patents by the inventor: No. 1,564,864 of Mar. 12, 1968 and No. 1,604,897 of Dec. 31, 1968.

By way of example, and not meant to be limitative, the catalytic coating for reducing the oxygen consists of carbon. This carbon may be secured to the electrode with the aid of a plastic binding agent, preferably a hydrophobic resin.

Additional aspects of the present invention will become further apparent from the following detailed description and from the accompanying drawings wherein.

Figure 1:
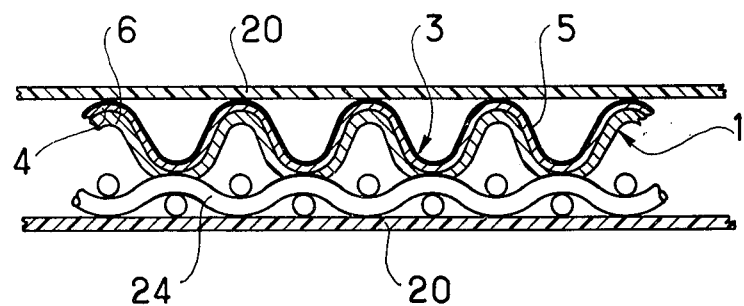
FIG. 1 is a schematic partial cross-sectional view through a group of thin plate-like components used in the make-up of an electrochemical generator according to the present invention.
Figure 2:
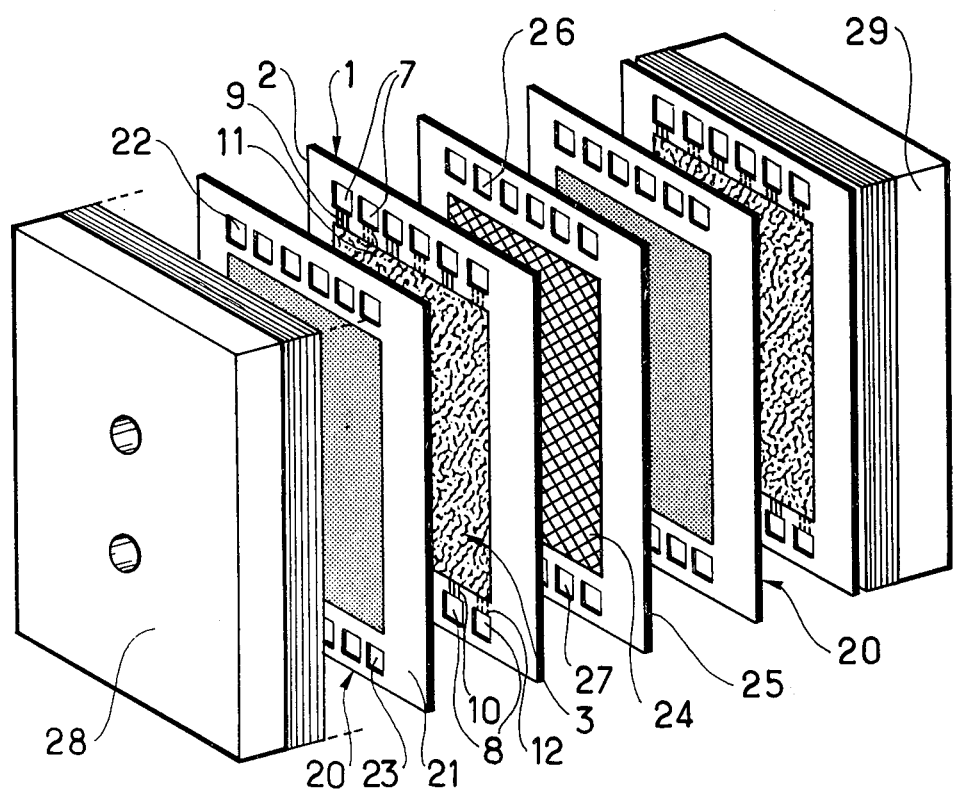
FIG. 2 is a perspective view at an enlarged scale representing schematically a generator according to the present invention.

In FIGS. 1 and 2, reference numeral 1 identifies a bipolar electrode. This electrode comprises a frame or housing 2 made from insulating plastic material having a thickness that is essentially equall to the mean thickness of the central portion of the electrode and defining an essentially rectangular shape or configuration for the active portion of the electrode. In FIG. 1, the visible face 3 of the bipolar electrode 1 constitutes the positive electrode and the hidden or opposite face constitutes the negative electrode.

The bipolar electrode 1 is made up of a thin embossed conductive plate or foil 4 of stainless steel or plastic material made conductive by means of an appropriate charge, for example a carbonaceous charge, having a thickness of several tens of microns, for example about 50 microns.

The thin foil or plate 4 is equipped, on that side of face 3 which is supplied with a gas containing oxygen, with a coating 5 of a catalyst for effecting reduction of the oxygen, e.g. carbon, fixed or secured by a plastic binder, preferably a hydrophobic binder such as polytetrafluoroethylene. Similar electrodes are described particularly in Belgian patent No. 754,335 filed on Apr. 3, 1970 and in the Belgian improvement patent No. 776,160 filed on Dec. 2, 1971.

Reference numeral 6 designates a zinc deposit carried by the other face of the plate or foil 4. This deposit may be produced electrochemically and may have a mean thickness of about 100 microns.

An even number of openings 7 on one edge of the electrode, and opening 8, on the opposite edge, allow for forming, by superposition with opposite adjacent opening in the other components, channels for supplying and removing the electrolyte from the assembled generator. Grooves or microchannels are made or obtained by impression in the frame or housing of the electrode. The microchannels 9 and 10, on the side of the positive electrode with the oxidizer, and microchannels 11 and 12 on the side of the negative electrode assure equal distribution in the supply and removal of the electrolyte for the two faces of the bipolar electrode. This arrangement is similar to the general structure defined in French patent No. 1,522,305. The length and the section thereof are such that they render negligible the shunting currents of the electrodes and allow for obtaining an equal loss of charge. These microchannels assure a uniform supply of fluid over each electrode, as well as a uniform supply from one electrode to the other.

The microchannels which assume the same supply or removal of one and the same fluid also provide an equal loss of charge.

These microchannels may diverge from the openings in the frames toward the edge of the electrode plate. The cross-sections thereof may be proportional to the lengths thereof. By way of example, the length of these microchannels may be in the order of 1 centimeter, and the width and depth thereof may be of several tenths of a millimeter.

For instance, in the case of an equal distribution of these microchannels on the edge of the electrode, the electrode may have one channel spaced about every 5 millimeters.

Projections may be disposed on an insulating band between the edge of the electrode and the outlets of the microchannels in order to avoid a deformation of the adjacent microporous membrane. They are preferably cylindrical in shape and distributed in a staggered or offset fashion so as to assure a uniform distribution of the electrolyte flow.

Reference numeral 20 designates a microporous membrane. It is equipped at the periphery thereof with a frame or housing 21 made of insulating plastic material perforated by openings such as 22 and 23 on opposite edges so as to form the channels for feeding and removing the electrolyte.

In the embodiment of the present invention shown, one microporous membrane 20 is in contact with the face 3 of the bipolar electrode 1 supplied with the oxygen-containing gas.

On the other hand, the face of the bipolar electrode 1 provided with the zinc coating or deposition is spaced from another membrane 20 by means of a screen or web 24 made of insulating material such as, for example, a polyamide.

This screen or web 24 is also equipped at its periphery with a frame or housing 25 made of insulating plastic material perforated by openings such as 26 and 27 on the opposite edges thereof which also form channels for feeding and removing the electrolyte.

The channels formed or constituted by the superposition of the openings placed one of the edges of each of the above-described components are alternately used for feeding or removing fluid from the positive face and for feeding or removing fluid from the negative face of the bipolar electrode.

The streams of the fluids flowing along the faces of the bipolar electrode are directed parallel with respect to each other and in the same direction.

The sum total of the thicknesses of the peripheal parts or portions, i.e. the frames, of each of the plate-like thin components is essentially equal to the sum of the thicknesses of the central parts or portions thereof, which assures that the components be kept in position with respect to each other. This arrangement is a necessary condition for obtaining a uniform distribution of the fluids.

The equal distribution of the charge losses inside the various compartments defined by the adjacent this components, as well as in the microchannels in communicating with the channels formed by the superposition of the openings provided in the edges of the thin components with these compartments, conjugated to the rectangular shape of these compartments, allows for obtaining uniform currents without turbulence, or eddy currents, and without any stationary zones. This has the effect of avoiding the formation of dendrites therein.

The electrochemically rechargeable generator according to the present invention is made up by assembling a plurality of the thin plate-like components such as those shown in FIG. 1.

This assembly may be obtained in a manner similar to those of the fuel cells improved by the inventor which have been described particularly in the following French patents Nos. 1,379,800; 1,399,765; 1,522,304; 1,522,305; 1,522,306; 1,564,864; 1,584,577, and 1,604,897 of Dec. 31, 1968.

In FIG. 2 reference numerals 28 and 29 designate the tightening plates providing the ends of the assemblage 3 of the thin generator components. These plates are equipped with means not shown in FIG. 2 which allow for feeding and for removing fluids therefrom. The entire unit of the components and the tightening plate may be connected by tie beams or the like securing means (not shown) which extend through appropriate openings in the frames or housings made of plastic material.

This consolidation or integral structure may also be achieved by molding a casting from a resin.

In order to simplify FIG. 1, the terminals of the generator also have not been illustrated therein.

Figure 3:
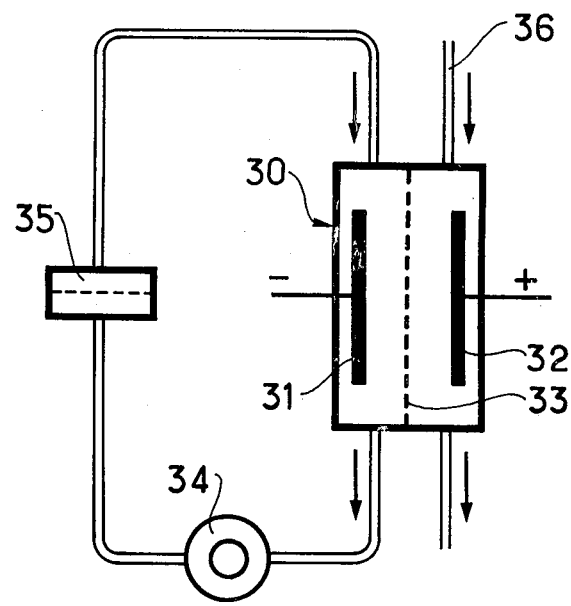
FIGS. 3 and 4 illustrate schematically circuits of the fluids used in two types of generators according to the present invention.
Figure 4:
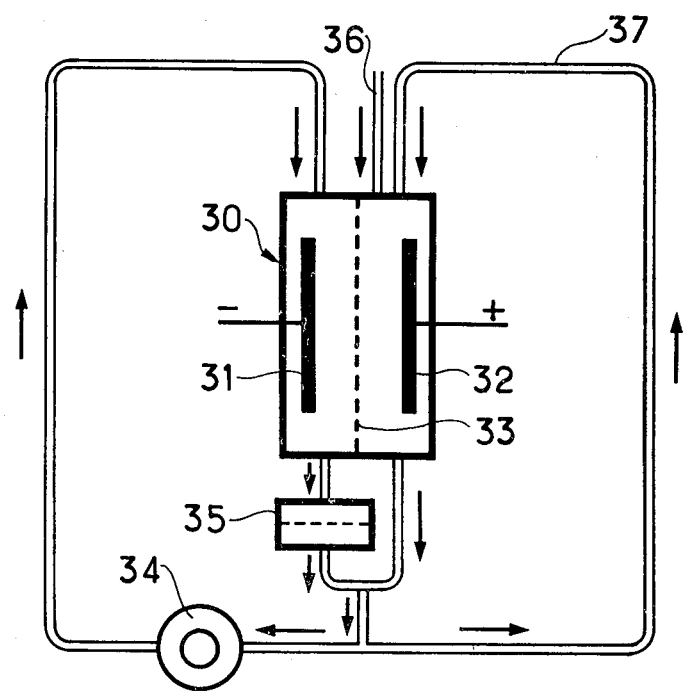

In FIGS. 3 and 4, reference numeral 30 designates a generator in accordance with the present invention.

A negative electrode 31 of zinc, and a positive electrode 32 supplied with a gas containing oxygen, separated by a microporous membrane 33 are schematically shown in these Figures.

FIG. 3 shows that embodiment in which the positive electrode 32 is supplied directly with a gas containing oxygen, for example air, and the process of operation is then called "process with gliding layer", and the arrow shows the direction of gas introduced through supply means 36.

Reference numeral 34 designates a pump, and reference numeral 35 represents a device or means for selectively precipitating and filtering zinc oxide from the electrolyte being recirculated past negative electrode 31.

FIG. 4 is an embodiment in which the positive electrode 32 is supplied by an emulsion of a gas containing oxygen, for example air, in a liquid electrolyte, particularly an alkaline electrolyte, for example, of the same type as that circulating in contact with the zinc.

Reference numeral 37 designates the supply of electrolyte allowing for making up or producing this emulsion and 36 again designates the air supply.

The electrolyte that has been supplied to the negative electrode is mixed, after filtering, with that electrolyte that has been supplied to the positive electrode; and the resultant electrolyte is divided and recycled.

The operation of a generator as proposed by the present invention is as follows:

In the course of the discharge, the pump 34 effects circulation of a potash solution having at least one normal concentration along the zinc electrode. At the contact of the hydroxyl ions of the potash solution, the zinc passes in solution in the form of zincate which precipitates at the beginning of the discharge as soon as it has reached its saturation concentration. The zinc oxide formed is taken along by the electrolyte circulation. The fact that the thickness of the space between the zinc layer and the microporous membrane remains at several tens of millimeters provides a very rapid circulation which eliminates any oxide layer which might have the tendency to form on the zinc layer and to passivate it. The zinc oxide entrained or taken along by this circulation must be separated from the potash solution in the filtering device 35 prior to the recycling of the solution in contact with the zinc layer.

With the discharge continuing, the zinc oxide precipitates at the level provided by the device 35.

In the course of the recharge of the generator, the zinc oxide stored in the device 35 is re-dissolved in the potash solution placed in circulation and zinc will be deposited on the face of the bipolar electrode opposite the side forming the electrode with the oxidizer gas. The active and regular circulation of the potash in the capillary interval between the bipolar electrode and the membrane reduces to a very large extent the formation of zinc dendrites which could take place if the electrolyte layer were thicker and assures a zinc deposit having an essentially uniform thickness.

Of course, an electrode with oxidizer will be used which is susceptible to undergoing the recharge without appreciable deterioration during a significant number of cycles by oxidation of the hydroxyl ions of a potash solution circulating at its contact, with freeing or the emission of oxygen.

The present invention accordingly provides for electrochemical generators having a capacity and an energy density per unit of volume or by weight being in the same order as those of the fuel cells, and very superior to those of the known accumulators with a solid oxidized compound.

Even though the embodiment described herein is preferred, it is understood that various modifications may be applied thereto without departing from the spirit and scope of the present invention. Specifically, certain of the elements described and disclosed herein may be replaced by others which function in the same manner. In addition, some of the components, for example the microporous membranes, need not include, on the edges thereof, a frame or housing made from synthetic material.

What is claimed is:

1. An electrochemical generator of electrical energy that is rechargeable electrochemically with liquid alkaline electrolyte which comprises:

a. a repetitive arrangement of groups of thin plate-like components equipped on their peripheal edge portions with openings providing due to the superposition thereof, inlet and outlet channels for the electrolyte and for a gas containing oxygen, each group having a total thickness smaller than about 1 millimeter, said components including frame portions made of insulating synthetic material that define active central portions having an essentially rectangular configuration therein; said active portions including an impervious unitary and integral bipolar electrode equipped on one face with a conductive surface with a catalytic coating for reducing the oxygen gas circulating at its contact in hydroxyl ions, and on the other face with a zinc layer, and a microporous membrane; at least some of said components being provided on the edges thereof with microchannels for introducing electrolyte from said inlet channels toward the zinc layer along its surface and the gas containing oxygen toward the conductive surface having the catalytic coating, and with microchannels for removing electrolyte having circulated along the surface of the zinc layer, and the residual gas having given up all or part of the oxygen which said gas contained after having circulated along the conductive surface having the catalytic coating; the microchannels assuring the same function for one and the same fluid having an equal loss of charge; the openings provided on the peripheries of the components being disposed on two opposite edges and provided in an even number on each of said edges and the channels formed due to the superposition of the openings placed on one of said edges being alternately utilized for the supply or removal of fluid from the positive face, and for the supply or removal of fluid from the negative face of the bipolar electrode, the flows of the fluids along the faces of the bipolar electrode being made parallel with respect to each other and in the same direction; means for maintaining an essentially constant spacing between said components and the free circulation of the fluids with an equidensity of the charge losses, the sum of the thicknesses of the peripheral portions of said components being equal to the sum of the thicknesses of the central portions of said components, b. tightening means for keeping said components assembled as a unit;

c. at least one separating means for selectively principitating and filtering zinc oxide formed during discharging of said generator entrained along by the electrolyte; and d. means for causing the electrolyte to circulate from the outlet channels toward said separating means and from the separating means toward the inlet channels.

2. An electrochemical generator according to claim 1, in which said means for maintaining the spacing between the components and the free circulation of the fluids with an equidensity of the charge losses comprise embossed portions of said bipolar electrodes having at least one of the faces thereof in contact with the microporous membranes.

3. An electrochemical generator according to claim 1, in which said means for maintaining the spacing between the components and the free circulation of the fluids with an equal density of the charge losses comprise a grating or web placed between at least one face of a bipolar electrode and a microporous membrane.

4. An electrochemical generator according to claim 3, in which the bipolar electrodes are embossed, the face thereof supplied by the gas containing oxygen being in contact with the microporous membranes, screen means made of an insulating material being interposed between the faces thereof supporting the zinc and the microporous membranes.

5. An electrochemical generator according to claim 1, in which the thicknesses of the bipolar electrode and of the microporous membrane are respectively on the order of from about 50 to 100 microns.

6. An electrochemical generator according to claim 1, in which the spacing between two adjacent microporous membranes is from several tenths of a millimeter to approximately 1 millimeter.

7. An electrochemical generator according to claim 1, which further comprises means for forming an emulsion beetween the gas containing oxygen and a liquid alkaline eletrolyte, that is preferably of the same type as that circulating in contact with the zinc layer, prior to its introduction in contact with the conductive surface having the catalytic coating.

8. An electrochemical generator according to claim 1, in which the microchannels diverge from the openings towards the edge of the electrode.

9. An electrochemical generator according to claim 1, in which the cross-sections of the microchannels are proportional to the length thereof.

10. An electrochemical generator according to claim 1, in which the length of the microchannels is in the order of 1 centimeter, the width and the depth thereof being of several tenths of a millimeter.

11. An electrochemical generator according to claim 1, in which the catalytic coating for reducing the oxygen consists of carbon.

12. An electrochemical generator according to claim 11, in which the carbon is fixed to said bipolar electrode by plastic binder, preferably a hydrophobic resin.

13. An electrochemical generator according to claim 1, wherein all of the components surrounding the bipolar electrodes are provided with said microchannels.

14. A rechargeable electrochemical generator comprising:
   a. a repetitive arrangement of superimposed groups of thin plate-like components, said arrangement defining inlet and outlet channels for the electrolyte and for a gas containing oxygen, each group having a total thickness of less than about 1 mm, at least some of said components including frame portions defining active central portions, said active portions including (1) an impervious unitary and integral bipolar electrode having a zinc layer on one face thereof and a layer of a catalyst for reducing oxygen gas as it contacts hydroxyl ions on the other face thereof, and (2) a microporous membrane, at least one of said components defining microchannels connecting said inlet and outlet channels with said active portions,
   b. means connecting to said arrangement for removing zinc oxide formed in the electrolyte during discharge; and
   c. transferring means for transferring electrolyte from said arrangement to said separating means during discharge.

15. The electrochemical generator of claim 14, wherein said transferring means is a circulating means for circulating electrolyte from one side of said arrangement through said separating means and back to another side of said arrangement.

16. The electrochemical generator of claim 14, wherein all of said components including bipolar electrodes are provided with microchannels connecting said inlet and outlet channels with said active portions.

17. The electrochemical generator of claim 14, wherein said active portions are rectangular in configuration.

18. The electrochemical generator according to claim 17, wherein said inlet channels are arranged on one side of the rectangles defined in the active portions of each component and the outlet channels are arranged on the opposite sides of said rectangles.

19. The electrochemical generator of claim 18, wherein said arrangement defines an even number of inlet channels on one side of said rectangles and an even number of outlet channels on the other side of said rectangles, alternate inlet channels being fluidly connected to one another so that said inlet channels can be alternately used for supply of fluid to the zinc layers of said bipolar electrodes and supply of a fluid to said catalyst layers of said bipolar electrodes, alternate outlet channels being fluidly connected to one another so that said outlet channels can be alternately used for removal of fluid from the zinc layers of said bipolar electrodes and for removal of fluid from said catalyst layers of said bipolar electrodes.

20. The electrochemical generator of claim 19, wherein each of said componenets including said bipolar electrodes is provided with microchannels connecting said inlet and outlet channels with said active portions.

21. The electrochemical generator of claim 20, wherein the microchannels communicating the inlet channels with said active portions are on one side of the frame elements of said components and the microchannels communicating the outlet channels with said active portions are on an opposite side of the frame elements of said commponents.

22. The electrochemical generator of claim 14, wherein the frame elements surrounding the bipolar electrodes have a thickness essentially equal to the mean thickness of the central portion of said bipolar electrodes.

23. The electrochemical generator of claim 14, wherein the bipolar electrodes and microporous membranes are each about 50 to 100 microns thick.

24. The electrochemical generator of claim 14, further including means for forming an emulsion of a gas containing oxygen with a liquid alkaline electrolyte connected to said arrangement for feeding said emulsion to the catalyst layers of said bipolar plates.

25. The electrochemical generator of claim 14, wherein said outlet channels are fluidly connected to said separating means and further wherein said separating means is fluidly connected to said inlet channels, whereby electrolyte can be pumped out of said outlet channels through said separating means and to said inlet channels during discharge.

26. The electrochemical generator of claim 14 wherein each bipolar electrode is goffered and in contact along its two faces with adjacent microporous membranes.

27. The electrochemical generator of claim 14, further including means for maintaining an essentially constant spacing between a bipolar electrode and the adjacent microporouus membrane facing the zinc layer of said bipolar plate.

28. The electrochemical generator of claim 27, wherein said maintaining means is a grid grating, screen, gauze or web having a thickness of several tenths of a millimeter to 1 mm.

29. The electrochemiical generator of claim 28, wherein said bipolar electrode is goffered.

30. The electrochemical generator of claim 14, wherein said bipolar electrodes and said microporous membranes are alternately arranged in said arrangement.

31. The electrochemical generator of claim 30, wherein each group comprising a bipolar electrode and the microporous membrane facing the zinc layer on the bipolar electrode further includes a grid grating, screen, gauze or web therebetween for maintaining an essentially constant spacing between said microporous membranes anad said bipolar electrodes.

32. The electrochemical generator of claim 14, wherein said grating grid, screen, gause or web is made from an insulating material.

33. The electrochemical generator of claim 32, wherein said insulating material is polyamide.

34. The electrochemical generator of claim 14, wherein the catalyst layers on said bipolar electrodes are non-porous.

35. A rechargeable electrochemical generator comprising: a repetitive arrangement of superimposed groups of thin plate-like components, said arrangement defining inlet and outlet channels for the electrolyte and for a gas containing oxygen, each group having a total thickness of less than about 1 mm, at least some of said components including frame portions defining active central portions, some of said active portions including (1) an impervious unitary and integral bipolar electrode having a zinc layer on one face thereof and a layer of a catalyst for reducing oxygen gas as it contacts hydroxyl ions on the other face thereof, others of said active portions including (2) a microporous membrane, at least one of said components defining microchannels connecting said inlet and outlet channels with said active portions.

* * * * *